Dec. 29, 1925.
J. SLEPIAN
1,567,763
ELECTROLYTIC CONDENSER TERMINAL
Filed Dec. 10, 1919
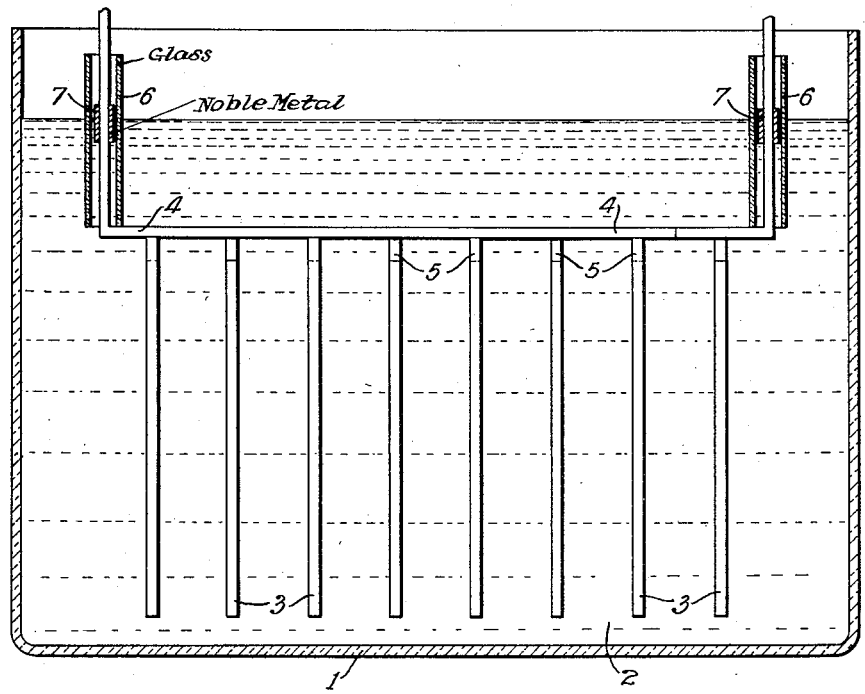
INVENTOR
Joseph Slepian.
BY
Wesley G. Carr
ATTORNEY Patented Dec. 29, 1925.

1,567,763

UNITED STATES PATENT OFFICE.

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTROLYTIC CONDENSER TERMINAL.

Application filed December 10, 1919. Serial No. 343,891.

*To all whom it may concern:*

Be it known that I, JOSEPH SLEPIAN, a citizen of the United States, and a resident of Wilkinsburg, in the county of Allegheny and State of Pennsylvania, have invented a new and useful Improvement in Electrolytic Condenser Terminals, of which the following is a specification.

My invention relates to terminals for electrodes of electrolytic condensers, lightning arresters, rectifiers and the like, by means of which the current enters and leaves an electrolytic bath.

It is commonly known that the terminals of apparatus of the character above designated become corroded, during use, at the points where they protrude from the electrolyte into the air or other gases above the electrolyte. The rate of this corrosion varies somewhat with different electrolytes because of differences in chemical composition and concentration. In time, the corrosion may reach such depth as to cause the electrode terminal to break off by reason of its own weight or by reason of jars or vibrations to which it may be subjected. Some electrolytes, which are electrically satisfactory, are not applicable to commercial use on account of rapid deterioration of their terminals. Other electrolytes, which are satisfactory as first supplied, in a short time become so concentrated by evaporation that they attack and corrode the terminals.

Furthermore, corrosion or incrustation of the terminals, particularly in electrolytic condensers, is a source of serious current leakage and, consequently, of a material watt loss.

I have discovered that this corrosion of the terminals at the juncture of the electrolyte and supernatant gas, and all salt formation upon the terminals at this point, together with the usual current leakage caused by this corrosion, are obviated if the voltage between the terminals and the immediately adjacent electrolyte is kept at substantially zero value.

The primary object of my invention, therefore, resides in the provision of a simple and effective means for maintaining a substantially zero-potential difference between the electrode terminals and the electrolyte immediately surrounding them adjacent to the point where the terminals emerge from the electrolyte.

Another object of my invention is to provide an electrode terminal for condensers, rectifiers, lightning arresters and the like, which shall obviate corrosion at the points where the terminals emerge from the electrolyte and thereby increase the length of continuous service of such apparatus.

A still further object of my invention is to provide an electrode terminal for condensers and the like by the employment of which the condensers may be made more compact than has been found possible heretofore, by obviating the necessity of providing a removable electrode terminal.

The accompanying drawing is a side view, partly in section and partly in elevation, of an electrolytic condenser to which my invention is applied.

In order to insure a clear and accurate understanding of my invention, I have shown an electrolytic condenser comprising a tank 1 formed of glass, or other suitable material, and an electrolyte 2 contained therein. Two series of suitable plates 3, of any desirable material, such for example, as aluminum, are alternately connected, in the usual manner, by terminals 4 of similar material, the plates 3 preferably having projecting portions 5 to which the terminals 4 are connected. At the points of emergence from the electrolyte 2, the terminals 4 are engaged by sleeves 7 of a metal which is not acted upon by the electrolyte, such as gold or some other noble metal. Dielectric sleeves 6, formed of glass or other similar material, are disposed about the terminals 4 to include a portion of electrolyte, immediately adjacent to the terminals and screen it from the main body of the electrolyte. As shown in the drawing, the dielectric members 6 surround the terminals 4 adjacent to their points of emergence from the electrolyte but are spaced therefrom and, being open at both ends, allow access of relatively thin layers of electrolyte adjacent to the terminals.

By providing thin layers of electrolyte around the terminals, at their points of emergence from the electrolyte, a path for electric current is provided having a high resistance which is interposed between the body of the solution and the point where the terminals protrude therefrom. Furthermore, by disposing additional metal upon the terminals 4 near the surface of the electrolyte, the current drawn will cause the IR drop in the thin layers of solution to be substantially equal to the voltage impressed upon the condenser and, consequently, there will be very little difference, if any, of potential between the terminals and the solution inside the glass or dielectric sleeves at the surfaces of the electrolyte. By thus ensuring substantially zero potential between the terminals and the electrolyte, where the terminals emerge from the electrolyte, sparking and resultant corrosion are avoided.

A noble metal is secured to the terminal because it possesses the desirable properties of preventing polarization and of resisting disintegration by the electrolyte. By preventing polarization at the point where the current leaves the column of electrolyte within the dielectric member and enters the terminal, the resistance to the flow of current at this point, is decreased, and a suitable value of current may be caused to traverse the thin layer of electrolyte to cause a desirable IR drop in the electrolyte. Other metals, such as iron, would prevent polarization but they are unsuitable because they would be disintegrated by the electrolyte. Although the noble metal is described as secured to the terminals in the form of sleeves, it may be utilized in a different manner, as by winding a small amount of it in the form of a fine wire about the terminals.

The renewal of corroded terminals has long been recognized as a great disadvantage in the employment of electrolytic condensers and like apparatus, and a simple and effective means for avoiding this necessity of renewing the terminals of the electrodes is considered a distinct advance in the art, especially in view of the fact that the means by which this corrosion is avoided comprises an inexpensive and easily manufactured device.

It is obvious that, by employing the principles of my invention, various devices may be manufactured which fall within its scope and I desire, therefore, that no limitations shall be imposed other than those indicated in the appended claims.

I claim as my invention:—

1. An electrolytic device comprising a containing vessel, an electrolyte therein, electrodes in said electrolyte, at least one of said electrodes being of a material acted upon by said electrolyte, a corrodible terminal for said active electrode, said terminal extending from within the electrolyte to outside of the surface thereof, and a noble-metal coating applied to said terminal adjacent the point where it passes through the surface of said electrolyte.

2. An electrolytic device comprising a containing vessel, an electrolyte therein, electrodes in said electrolyte, at least one of said electrodes being of a material acted upon by said electrolyte, a corrodible terminal for said active electrode, said terminal extending from within the electrolyte to outside of the surface thereof, a noble-metal coating applied to said terminal adjacent the point where it passes through the surface of said electrolyte, and means for causing the terminal portions adjacent to said noble-metal coating to be surrounded by only a relatively thin film of electrolyte.

3. A terminal for electrolytic condensers, lightning arresters or the like comprising an electrode, a terminal therefor having a piece of noble metal in intimate engagement therewith, and a dielectric member surrounding the terminal.

4. A terminal for electrolytic condensers, lightning arresters or the like comprising an electrode, a terminal therefor having a piece of gold in intimate engagement therewith, and a dielectric member surrounding the terminal.

5. A terminal for electrolytic condensers, lightning arresters or the like comprising an electrode, a metallic terminal member having a piece of gold in intimate engagement therewith, and a glass sleeve of sufficient diameter to surround said member and to provide a relatively small space between said member and said sleeve.

In testimony whereof, I have hereunto subscribed my name this 18th day of November 1919.

JOSEPH SLEPIAN.